Patented Jan. 8, 1946

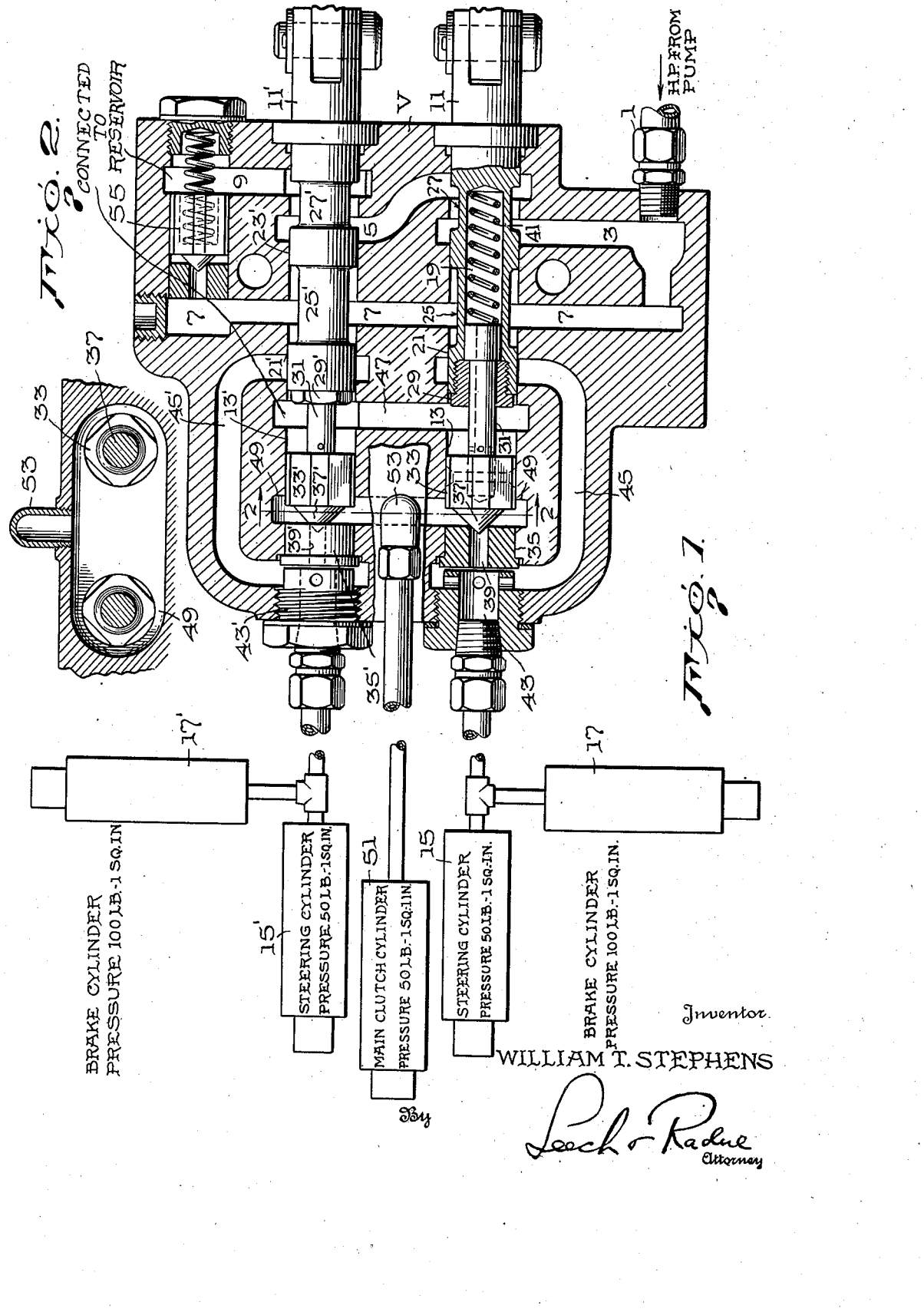

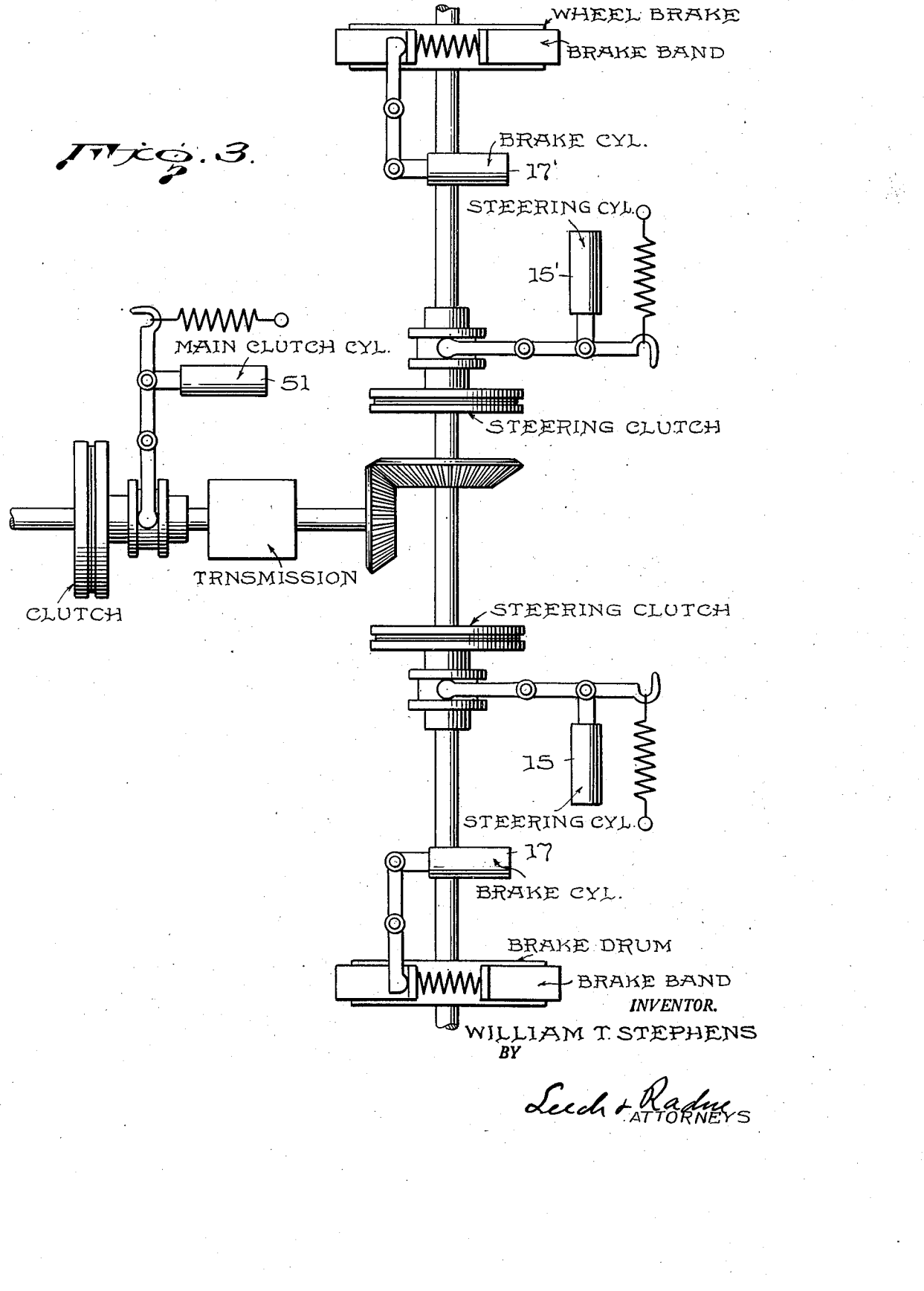

2,392,423

UNITED STATES PATENT OFFICE 2,392,423

HYDRAULIC CONTROL SYSTEM

William T. Stephens, Cleveland, Ohio, assignor to Hydraulic Control Engineering Company, Cleveland, Ohio, a corporation of Ohio Original application November 9, 1942, Serial No. 465,059. Divided and this application August 21, 1943, Serial No. 499,543

12 Claims. (Cl. 180—9.2)

The present invention relates to hydraulic control systems for vehicles and particularly to control apparatus and equipment therefor.

More particularly the invention relates to hydraulic controls for actuating steering means, applying braking means, clutching and declutching prime movers from drive shafts, and arresting movement of planetary transmissions of tractor vehicles, especially but not only tracklaying tractors. The invention contemplates novel and simply constructed hydraulic valve mechanism for minutely controlling these operations with positiveness and without substantial physical effort on the part of the operator.

Track-laying vehicles are of two general types, one type using individual clutches for controlling the application of driving power to the two drive sprockets, and a second type using a planetary transmission intermediate the sprockets. The first type usually requires some form of conventional brake on each of the drive shafts for individually or jointly arresting movement thereof. The second type may not require an individual braking system due to the inherent constitution of the planetary transmission but in many cases such brakes are provided or desirable. Both types of drive utilize a main clutch for coupling and uncoupling the track driving mechanism to the tractor power plant. The steering, braking and declutching of the driving mechanisms of both types have heretofore been operated by manually positioned levers.

Steering for the first type of tractor drive wherein disk clutches are utilized is accomplished by disengaging the driver or sprocket clutch on the side toward which the vehicle is to be turned and simultaneously continuing the application of power on the opposite side. Thus, the vehicle pivots about the undriven or dead track. For shorter turns the undriven track is braked to insure its remaining stationary. In braking, the driver clutches are first disengaged to protect them from the destructive action which would result from the retarding action of the brakes while the clutches are still transmitting power from the engine.

In steering and braking the second type of tractor using a planetary transmission for driving the chain sprockets, a steering brake is applied to a transmission part of one side driver to retard or stop its motion while allowing motion on the opposite driver, generally at an increased speed. Thus, the steering is quite similar to the first type. When it is desired to stop the vehicle, both side drive shafts are braked subsequent to releasing the main clutch.

In practicing this invention the individual braking means, steering means, planetary transmissions, and clutch disengagers of track-carrying tractors are actuated by conventional hydraulic cylinders, rams or jacks receiving fluid from a suitable hydraulic pressure system of this invention per se. The arrangement and operation of these devices is unique and their sequence of application is by means of novel hydraulic valves and associated parts the specific construction of which forms the feature of my copending application, Serial No. 465,059, filed November 9, 1942, of which this application is a division. The broad concept of the invention and the generic principles of the valve per se are disclosed and claimed in my copending application, Serial No. 455,955, filed August 24, 1942, of which this application is a continuation in part.

In the drawings:

Figure 1 is a diagrammatic layout of the hydraulic cylinders for operating the brakes, steering means and declutching cylinder of either type of track-laying tractors with the hydraulic control valve therefor shown in cross section;

Figure 2 is a fragmentary vertical section through the valve plungers and portion of the valve casing taken on line 2—2 in the direction of the arrows, and Fig. 3 is a schematic and diagrammatic illustration of the essential parts of a tractor showing the devices of the present invention applied thereto.

These several operations of steering the tractor either to the right or left, the application of the brakes to stop the tractor, and the removal of power to the drive axles at substantially the moment the brakes are applied, may be readily controlled by the use of valves and suitable hydraulic system means having the novel features of this invention.

To enable those skilled in the art to understand the broad aspects of operation of this invention the following is a general description thereof.

With the manually operable plungers of the dual control valve V in neutral or nonoperative position, as shown in the drawings, oil from a suitable positive displacement pump in the hydraulic system enters the valve casing through inlet 1 and flows freely in passages 3—5—7 and 9, this latter passage leading back to the oil storage tank or reservoir of the system.

Two identical valve plungers 11, 11' are mounted in spaced parallel horizontal bores 13, 13', extending through the casing, and control the hydraulic fluid passing through the valve and leading to exterior piping connected to steering cylinders 15, 15', braking cylinders 17, 17', and clutch cylinder 51. It will be understood that these hydraulically operated devices, diagrammatically shown, are provided with suitable pistons and linkages for connection to and operation of the friction bands or other steering means and brakes of the tractor steering and braking mechanisms and the clutch of the tractor engine as shown in Fig. 3 for instance. These conventional mechanisms per se form no part of the present invention. They may be applied to replace the manual levers in such devices as depicted in the patent to White 1,872,541, granted August 16, 1932. In the patent the manual levers 29, 29, 42, 42 and the main foot clutch would be replaced by the operating cylinders of this invention, as is obvious. Any application of the invention herein described is shown in Fig. 3 where clutches are used for steering. Adequate legends on this figure and the use of reference numerals corresponding to those in Fig. 1 eliminate the need for elaborating on the construction or operation of the system herein shown.

The cylindrical reciprocable valve plungers 11 and 11' are identical in construction and operation and each plunger has an axial bore 19, and exterior spaced lands 21 and 23 with adjacent reduced diameter groove portions 25 and 27. The enlarged inner ends or lands 21 of the valve plungers carry threaded bushings 29 through which extend the stems 31 of the secondary relief valves 33 which normally engage and close apertures in valve seats 35. The head portions of these secondary relief valves are substantially square in cross section, as disclosed in Fig. 2, to permit the flow of fluid therearound when the conical ends 37 thereof are raised from engagement with the passages 39, 39' through the valve seats. These passages are normally closed by the ends 37 under the influence of springs 41 positioned in the longitudinal bores 19 of the valve plungers and pressing on the enlarged inner ends of the relief valve stems 31.

The operation of either pair of steering and braking cylinders 15, 17 and 15', 17', is identical and, thus, to project the actuating piston in steering cylinder 15, the valve plunger 11 is moved partially inward to a position where the high pressure fluid in the system will flow through inlet 1 and passage 3 to passage 7 and thence to duct 45, around groove 25. At the same time, the outer end of the plunger closes off communication between passage 3 and passage 5 so that high pressure fluid is no longer by-passed to the tank to relieve the pump as in the neutral position of both valves. The position of groove 25, following this initial movement of the plunger, to where it bridges passages 7 and 45, allows oil under pressure to flow through port 43 of the outlet plug and through the connecting conduit to cylinder 15 to thereby move the piston therein to operate and apply the steering means of the tractor. The pressure fluid also flows through the same pipe to braking cylinder 17, but this cylinder is constructed so as to not operate until supplied with fluid at about 100 pounds per square inch, while the steering cylinder is constructed to operate at a fluid pressure of about 50 pounds per square inch. As subsequently described the pressure delivered by the movement of the valve plunger just described is limited to not much more than 50 pounds per square inch.

The partial inward movement of the plunger 11 places a compression of slightly above 50 pounds per square inch on relief valve 33 and, consequently, as soon as the steering cylinder 15 set for this pressure has functioned, the back pressure will raise valve 33 from its seat and allow the fluid to bypass through opening 39, passage 49, around the square head of the relief valve to passage 47 coupled to a return line leading to the reservoir of the system. The spring loading and compression is such that the plunger 11, when moved in sufficiently for the land 21 to close off communication between passage 49 and passage 47 by way of relief valve head, loads the relief valve so that about 50 pounds per square inch is maintained at port 43. However, when the piston in steering cylinder 15 reaches the limit of its stroke, the internal resistance therein rises above 50 pounds per square inch and the relief valve opens as before described.

When the plunger 11 is retracted, after operation of the steering cylinder to its original position, the spring loading on the relief valve 33 is fully or substantially relieved and fluid from the cylinder 15, which may be spring loaded to the desired amount, freely returns to the storage reservoir by lifting the valve 33 from its seat and flowing around the seat to passage 47 connected to the fluid storage tank. The second valve plunger 11' is similarly operated to energize the opposite steering cylinder 15', the partial movement of the plunger 11' controlling the right-hand steering cylinder.

When it is desired to stop or positively apply both brakes and disengage the power clutch of the prime mover it is accomplished by forcing both valve plungers 11 and 11' to their innermost positions and, thus, fluid pressure will pass through passage 3 to passages 7, 45 and 45', and through outlet ports 43, 43' to both steering cylinders 15 and 15', and braking cylinders 17 and 17'. The steering cylinders operate and the oil pressure therein builds up to approximately 100 pounds per square inch now necessary to raise relief valves 33 because of the increased spring pressure, and bypass oil to passage 49. Oil then passes to the clutch operating cylinder 51 through passage 49 and port 53 leading to the clutch cylinder.

This declutching action is accomplished by blocking the flow of oil by lands 21 between passages 49 and 47 due to the forcing of the valve plungers 11 and 11' to the limit of their inward stroke and the placing of a spring loading on the relief valves 33 of above 50 pounds per square inch and less than 100 pounds per square inch. Inasmuch as the flow of fluid to passage 47 is blocked by the lands 21 of plungers 11 and 11' the oil is forced to circulate through passage 49 and, thence, to port 53 and clutch cylinder 51. The piston in clutch cylinder 51 is set to operate at approximately 50 pounds per square inch and, consequently, when the limit of its stroke is reached, the clutch will be disengaged and the internal resistance therein will build up to 100 pounds per square inch and, thus, operate the brake cylinders 17 and 17' that are set for this increased pressure.

Based on this general description of the operation of the present improved hydraulic control valve, it will be appreciated that the valve may be used in several specific combinations. For instance, when it is desired to control a tractor of the first type wherein disk clutches are used for applying power to the driving sprockets, the present control is capable of operating the hydraulic cylinders for steering, braking, and declutching the power shaft. A modification of the control of this first type is involved where only steering and braking control is provided. In the second type of track-laying tractor control where a planetary transmission is used for driving the chain sprockets, the present system may provide a means of steering, braking, and master clutch control, or a modification of this second type where only steering and braking control is provided. These two main control systems and their modifications will now be described in some detail.

To carry out the control of a tractor using disk clutches where steering, braking, and declutching is desired, the hydraulic valve is operated to energize steering cylinder 15 only by depressing plunger 11 in a sufficient amount to produce a pressure setting of secondary relief valve 33 of slightly over 50 pounds per square inch. When this is done, the land to the right of recess 27 of plunger 11 closes off bore 13 between passages 3 and 5 and, at the same time, the groove 25 of the plunger bridges passages 7 and 45 to allow oil from passage 7 to be communicated therethrough via passage 3 and high pressure inlet port 1. The oil flows to passage 45 via bore 13 around groove 25 and thence to cylinders 15 and 17 through outlet port 43. After the piston in cylinder 15 has reached the end of its stroke and the pressure therein builds up to a point exceeding the spring setting of valve 33 in bore 13, the valve head 37 is cracked or lifted and the oil by-passes back to the storage tank by one of two routes. Thus, oil may pass through passage 39 in valve seat 35 through passage 49, through bore 13', around valve head 37', and through passage 47, or the oil may pass through passage 39 in valve seat 35 through bore 13, around valve head 37, and through passage 47. When the plunger 11 is retracted and is returned to the neutral position by means of spring 41, the pressure setting of relief valve 33 is simultaneously released and permits a return flow of oil from cylinder 15 and thence through port 43 and passage 39 where it lifts valve head 37 and returns to the tank, as previously described. The steering cylinder 15' is operated in a similar manner by plunger 11'.

In the event that either plunger 11 or 11' is not moved inwardly sufficiently to produce a 50 pound pressure or other desired pressure setting to operate either cylinder 15 or 15', the relief valves 33 and 33' will open at the lower setting and allow the oil to pass back to the tank without producing movement of the piston in the steering cylinder.

To operate the brake cylinder 17, it is necessary that the plunger 11 be pressed in sufficiently to produce a relief valve setting in excess of 100 pounds per square inch on the valve 33. When this is done, oil will then flow to both cylinders 15 and 17 and, since cylinder 15 is set to operate at a lower pressure than cylinder 17, cylinder 15 will function ahead of cylinder 17 and disengage the driver but not the main clutch before sufficient pressure is built up to operate brake cylinder 17. This sequence of operation assures the release of the driver clutch prior to the application of the brake. After brake cylinder 17 has functioned and the piston therein has reached the end of its stroke, fluid pressure is built up exceeding the setting of the relief valve 33 and, consequently, the valve head 37 is lifted from its seat and the oil will pass back to the tank, as previously described. However, if the plunger 11 has been pushed in a sufficient amount, so that land 21 has closed bore 13 between passages 49 and 47, the oil can return to the tank only through passages 39, 49, 13' and through 47.

In a similar manner, brake cylinder 17' is caused to operate by pressing in plunger 11', and the operation of either brake cylinder 17 or 17', as described, makes possible the turning of the tractor on a small radius, as the application of the brake locks the sprocket driver and prevents any coasting as would be the case if the driver were merely disconnected by means of the driver clutch controlled by cylinder 15 or 15'.

When it is desired to completely arrest movement of the tractor and also to disengage the main clutch controlled by cylinder 51, both plungers 11 and 11' are pressed inwardly simultaneously and to the extent of their travel. This action causes the lands 21 and 21' to close off bores 13 and 13' between passages 49 and 47 and the oil thereupon flows to and acts on cylinders 15, 15'. When the cylinders 15 and 15' have reached the end of their stroke and sufficient pressure is built up to lift the valve heads 37 and 37' of valves 33 and 33', the oil is forced to flow to passage 49 through passages 39 and 39' in valve seats 35 and 35'. Since both bores 13 and 13' are closed off between passages 49 and 47, oil flows from passage 49 to cylinder 51 via port 53. Consequently, when cylinder 51 has operated and the oil pressure has again built up, it reacts on cylinders 17, 17' and when these open fully the oil acts against main relief valve 55, through passage 7, lifting it from its seat and allowing the oil to flow back through passage 9 to the storage tank. The setting of relief valve 55 is such that it always exceeds the maximum setting of the secondary relief valves 33 and 33' and thus assures the proper sequence of operations.

When the valve is used for the modified control of vehicles of the first general type and only steering and braking control is provided, the system operates substantially as before described, with the exception that port 53 is plugged off and cylinder 51 removed or not used. Thus the sequence of operations ceases after the brakes have been applied and the resulting build up of pressure reacts on valves 33 and 33'. When these valves are open, the oil can only pass into passage 49 and as this has been blocked by the plug in port 53, the reaction pressure is carried back to the main relief valve 55 and the oil is by-passed via passage 9 to the storage tank. This type of control is used where some form of manual operator is provided for disengaging the main clutch.

Referring now to the second general form of drive wherein one type of planetary transmission is used, the cylinders 15 and 15' are used to apply the brakes on the planetary system and the cylinder 51 is used to operate the main clutch. The operation of cylinders 15 and 15' is identical to that previously described for operating the driver clutch in the first general type of tractor. When it is desired to stop the tractor and disengage the main clutch, both plungers 11 and 11' are positioned all the way in and this produces an identical condition to the first form of control with the plungers all the way in. The passage of oil is the same as previously described for this condition except that the cylinders 17 and 17' are eliminated.

With the modified control of a planetary transmission system, the operation is identical to that of the modified control of the first type of tractor, except, of course, the cylinders 17 and 17' have been eliminated and an independent clutch control is necessary for disengaging the main clutch.

Thus, the four customary ways of operating a track-laying vehicle have been described in detail and it is apparent that, while the use of the present hydraulic control valve and system embraces these four systems, it is in no way limited thereto.

The hydraulic operation of the steering cylinders and disengagement of the engine clutch prevents any tendency of the tractor to spin around when the brakes are applied and positively prevents the application of the brakes when the clutch is engaged and torque is still on the drive sprockets and, thus, the brakes will only be called upon to arrest movement of the tractor.

As a further safety feature for the entire hydraulic system, the previously mentioned, spring tensioned main relief valve 55 positioned between passages 7 and 9 is provided, whereby if a back pressure in excess of 100 pounds per square inch builds up in the system, the relief valve will crack and bleed fluid through passage 9 to the storage tank. Since such an excessive pressure will only be present after the brake cylinders set for 100 pounds per square inch have functioned, the system will have accomplished its useful work before this excessive pressure is built up and the relief valve 55 is unseated.

Other forms of hydraulically operated units using a plurality of cylinders operating in a definite sequence and utilizing different operating pressures, or where it is desired to serially operate a plurality of hydraulic devices some of which operate at lower pressure than others, are broadly included within the scope of this invention.

What I claim is:

1. A hydraulic control for tractors of the type having a separate steering and a separate braking means on each of two drive shafts at opposite sides of the tractor thereof and a prime mover having a clutch for applying the power thereof to said drive shafts, the combination therewith of a hydraulic fluid pressure system including a plurality of hydraulically actuated devices one for operating each said steering and each said braking means and said clutch, means for controlling delivery of fluid to said devices including separate means for selectively actuating each said steering means without actuating said braking means and clutch, and said separate controlling means being arranged for serially actuating said clutch and said braking means when operated in unison.

2. A hydraulic control for tractors as set forth in claim 1, wherein the steering means actuating devices are operable at a low pressure and the brake means actuating devices are operable at a higher pressure.

3. A hydraulic control for tractors as set forth in claim 1 wherein the operation of the control means to energize the brake means actuator devices creates a pressure through the said control means whereby the clutch actuator is operated slightly ahead of the actuation of said brake means actuation devices.

4. A hydraulic control for tractors and the like of the type having a separate steering and a separate braking means on each drive shaft thereof, which shafts are disposed at relatively opposite sides of the tractor and a prime mover having a clutch means for applying the power thereof to said drive shafts, the combination therewith of a hydraulic system including a source of fluid under pressure and a hydraulically actuated motor for each of said means, a pair of independently operable valves for controlling the flow of said fluid to said motors, each being associated with the motor for one braking and one steering means, each valve including means dependent on the extent of movement thereof to actuate its steering means motor independently or sequentially with the corresponding braking means motor, and automatic valves dependent for operation on the simultaneously positioning of the first mentioned valves to braking position and on fluid pressure to connect the clutch means motor for operation.

5. A hydraulic control for tractors and the like of the type having separate steering and braking means on each drive shaft thereof, which shafts are disposed at relatively opposite sides of the tractor, the combination therewith of a hydraulic system including a source of fluid under pressure and a hydraulically actuated motor for each of said means, each steering means motor being constructed and arranged to operate at a pressure less than that necessary to actuate the braking means motor, a pair of independently operable valves for controlling the flow of said fluid to said motors, each being associated with the motor for one braking and one steering means through a common pipe directly open to both motors, each control valve including a pressure responsive relief means whereby low pressure can be delivered to actuate only the steering means motor or high pressure to sequentially actuate that motor and the one for the braking means.

6. A hydraulic control for tractors and the like of the type having separate steering and braking means on each drive shaft thereof, which shafts are disposed at relatively opposite sides of the tractor and a prime mover having a clutch means for applying the power thereof to said drive shafts, the combination therewith of a hydraulic system including a source of fluid under pressure and a hydraulically actuated motor for each of said means, a pair of independently operable valves for controlling the flow of said fluid to said motors, each being associated with the motor for one braking and one steering means through a common pipe, each valve including means to deliver said fluid under pressure to actuate its motors and a pressure responsive relief means whereby low pressure can be delivered to actuate only the steering means motor or high pressure to sequentially actuate that motor and the one for the braking means, each relief means being biased by a spring whose tension is adjusted by the position of the corresponding operable valve, means on each valve positioned when the valve is moved to its maximum to stop the flow of relieved fluid from its relief valve and said clutch motor being connected for operation by the pressure liquid discharging from both relief valves.

7. A hydraulic control for tractors and the like of the type having separate steering and braking means on each drive shaft thereof, which shafts are disposed at relatively opposite sides of the tractor and a prime mover having a clutch means for applying the power thereof to said drive shafts, the combination therewith of a hydraulic system including a source of fluid under pressure and a hydraulically actuated motor for each of said means, a pair of independently operable valves for controlling the flow of said fluid to said motors, each being associated with the motor for one braking and one steering means through a common pipe, each valve including means to deliver said fluid under pressure to actuate its motors and a pressure responsive relief means opening to waste whereby low pressure can be delivered to actuate only the steering means motor or high pressure to sequentially actuate that motor and the one for the braking means, said operable valves being arranged to each be movable to a position to shut off flow of discharged liquid from the corresponding relief means to waste, and a passage to collect and divert said liquid to the clutch motor when both valves are so positioned.

8. A hydraulic control for tractors and the like of the type having separate steering and braking means on each drive shaft thereof, which shafts are disposed at relatively opposite sides of the tractor and a prime mover for applying the power thereof to said drive shafts, the combination therewith of a hydraulic system including a source of fluid under pressure and a hydraulically actuated motor for each of said means, a pair of independently operable valves for controlling the flow of said fluid to said motors, each being associated with the motor for one braking and one steering means, each valve including relief means to return fluid to the low pressure side of the system, the operating pressure of said relief means being so under the control of the corresponding operable valve that the steering motor may be alone operated or it may be operated in sequence with the brake motor, said operable valves each having a position for operating the steering motor and another for operating the steering motor and brake.

9. A hydraulic control for tractors and the like of the type having a separate steering and braking means on each drive shaft thereof, which shafts are disposed at relatively opposite sides of the tractor and a prime mover having a clutch means for applying the power thereof to said drive shafts, the combination therewith of a hydraulic system including a source of fluid under pressure and a hydraulically actuated motor for each of said means, a pair of independently operable valves for controlling the flow of said fluid to said motors, each being associated with the motor for one braking and one steering means, each valve including relief means to return fluid to the low pressure side of the system, the operating pressure of said relief means being so under the control of the corresponding operable valve that the steering motor may be alone operated or it may be operated in sequence with the brake motor, the said relief means discharging simultaneously to the clutch motor and to the low pressure side of the system, said operable valves being arranged when operated simultaneously to close off the relief means discharge to low pressure whereby the clutch motor will be operated by fluid passing the relief means.

10. A system of tractor control including a hydraulically actuated steering cylinder for each side of the vehicle; a hydraulically actuated braking cylinder for each side of the vehicle and requiring a higher liquid pressure for operation; and a single clutch cylinder operable at a liquid pressure commensurate with that required by the steering cylinders; a dual valve for controlling the flow of high pressure liquid to said cylinders, said valve including two manually operable plungers each alone in control of the flow of pressure liquid to the steering and braking cylinders on one side of the vehicle, and means effective on joint operation of said plungers in a direction to deliver liquid to said steering and braking cylinders to deliver pressure fluid to the clutch cylinder prior to the pressure becoming great enough to actuate the brake cylinders.

11. A system of tractor control including a hydraulically actuated steering cylinder for each side of the vehicle; a hydraulically actuated braking cylinder for each side of the vehicle and requiring a higher liquid pressure for operation; and a single clutch cylinder operable at a liquid pressure commensurate with that required by the steering cylinders; a dual valve for controlling the flow of high pressure liquid to said cylinders, said valve including two manually operable plungers each alone in control of the flow of pressure liquid through a common pipe to the steering and braking cylinders on one side of the vehicle, a pressure relief means associated with the delivery side of each plunger to vent liquid at excess pressure, the venting pressure of said relief means being fixed by the position of the corresponding plunger so that only the steering cylinder may be operated or this cylinder may be sequentially operated with the braking cylinder, and means dependent upon the positioning of both valves to divert the relieved liquid from both relief means to operate the clutch cylinder.

12. A system of tractor control including a hydraulically actuated steering cylinder for each side of the vehicle; a hydraulically actuated braking cylinder for each side of the vehicle and requiring a higher liquid pressure for operation; and a single clutch cylinder operable at a liquid pressure commensurate with that required by the steering cylinders; a dual valve for controlling the flow of liquid under pressure to said cylinders, said valve including two manually operable plungers each alone in control of the flow of pressure liquid through a common pipe to the steering and braking cylinders on one side of the vehicle, a pressure relief means associated with the delivery side of each plunger to vent liquid at excess pressure to waste, the venting pressure of said relief means being fixed by the position of the corresponding plunger so that only the steering cylinder may be operated or this cylinder may be sequentially operated with the braking cylinder, means on each plunger movable therewith to close the corresponding relief means vent to waste and a connection from the discharge side of both relief means to collect the vented liquid for delivery to the clutch cylinder whereby the same is actuated when both plungers are properly set following the actuation of both steering cylinders and is followed by the actuation of both brake cylinders by the higher pressure developed.

WILLIAM T. STEPHENS.